Aug. 2, 1932.  E. H. LICHTENBERG  1,869,903
SIPHON WATER TANK
Filed Dec. 23, 1929   2 Sheets-Sheet 1

INVENTOR
E. H. Lichtenberg
BY
Robert Robb
ATTORNEYS

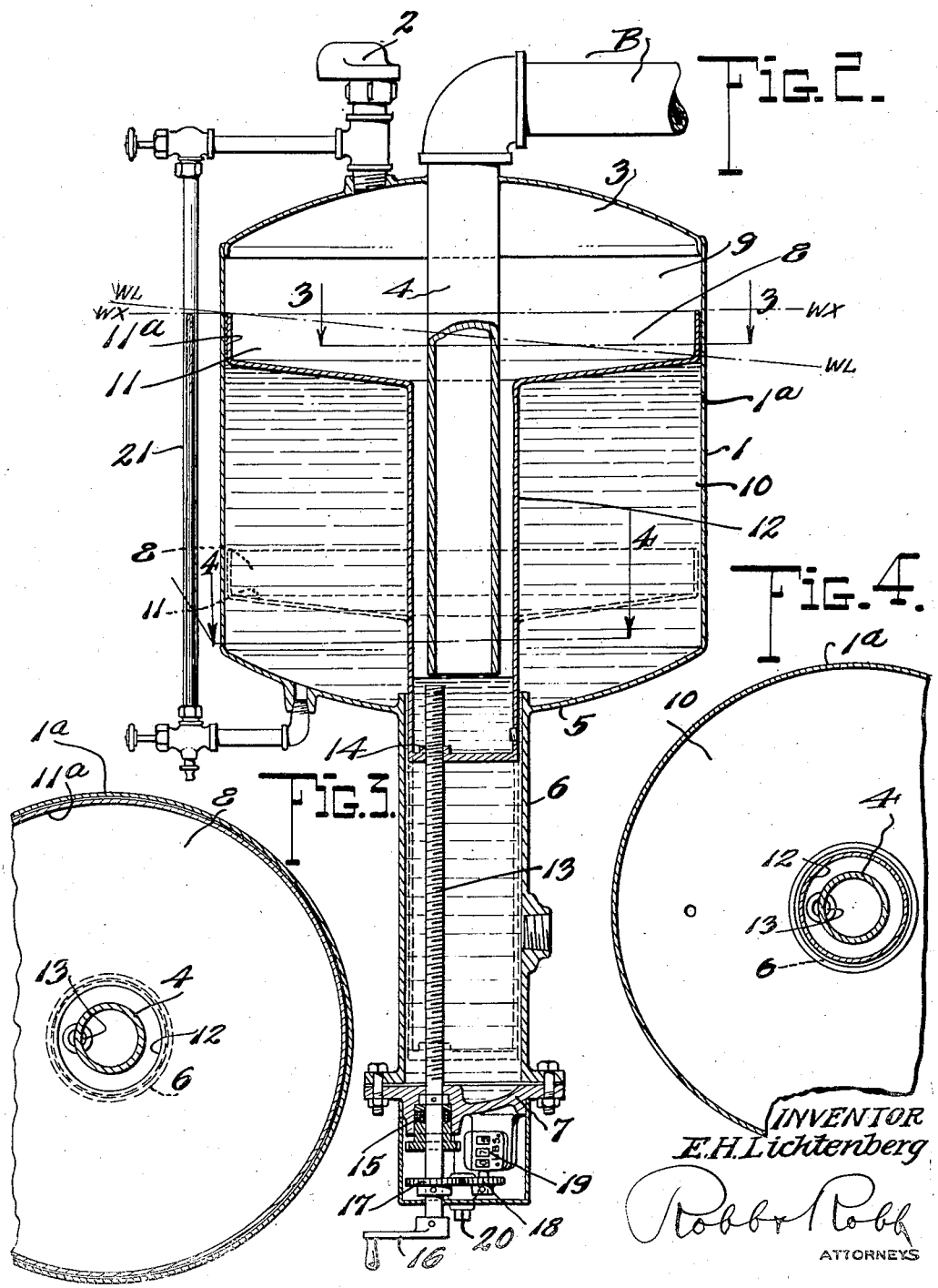

Patented Aug. 2, 1932

1,869,903

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

SIPHON WATER TANK

Application filed December 23, 1929. Serial No. 416,137.

This invention relates to new and improved liquid measuring apparatus and more particularly to measuring apparatus for supplying measured quantities of water to concrete mixing machines.

Highway construction engineers have found that in order to obtain maximum strength in concrete it is necessary to control with precision the amount of water which goes into the mixture in exact ratio to the quantity of cement therein. Also, modern highways for high speed traffic are often formed with banked curves, and when a concrete paving machine is working on one of these curves, the machine may be tilted to a considerable degree which makes it necessary to provide a water measuring tank in which this tilting does not affect to any appreciable extent the quantity of water delivered.

Paving machines are at present being designed with a very low overhead clearance which makes it necessary to mount the water measuring tank at one side of the mixing drum and below the top thereof. It is, however, desirable to elevate the tank as much as possible since the rate of discharge is to a great extent dependent upon the level of the head of water above the discharge opening in the mixing drum.

An object of this invention is to provide a liquid measuring apparatus which governs to a maximum degree the quantity of water discharged from the tank by retaining within the tank a quantity of water and varying the quantity at the will of the operator to thereby vary the amount to be delivered.

Another object of my invention is to provide a water measuring apparatus which may be placed on the side of a paving machine at a maximum elevation, utilizing the siphon principle to withdraw a measured quantity of water and providing means for varying the quantity.

A further object of my invention is to provide a water measuring apparatus which is simple in construction, easily operated and self cleaning in operation.

Other and further objects and advantages of the invention will be hereinafter set forth and the novel features thereof defined by the appended claims.

In the drawings:—

Fig. 2 is a central, vertical, longitudinal, sectional view through my improved measuring apparatus, provided with a conventional liquid closing check valve instead of the standpipe shown in Fig. 1;

Fig. 3 is a sectional view on line 3—3 of Fig. 2; and

Fig. 4 is a sectional view on line 4—4 of Fig. 2.

Figure 1:
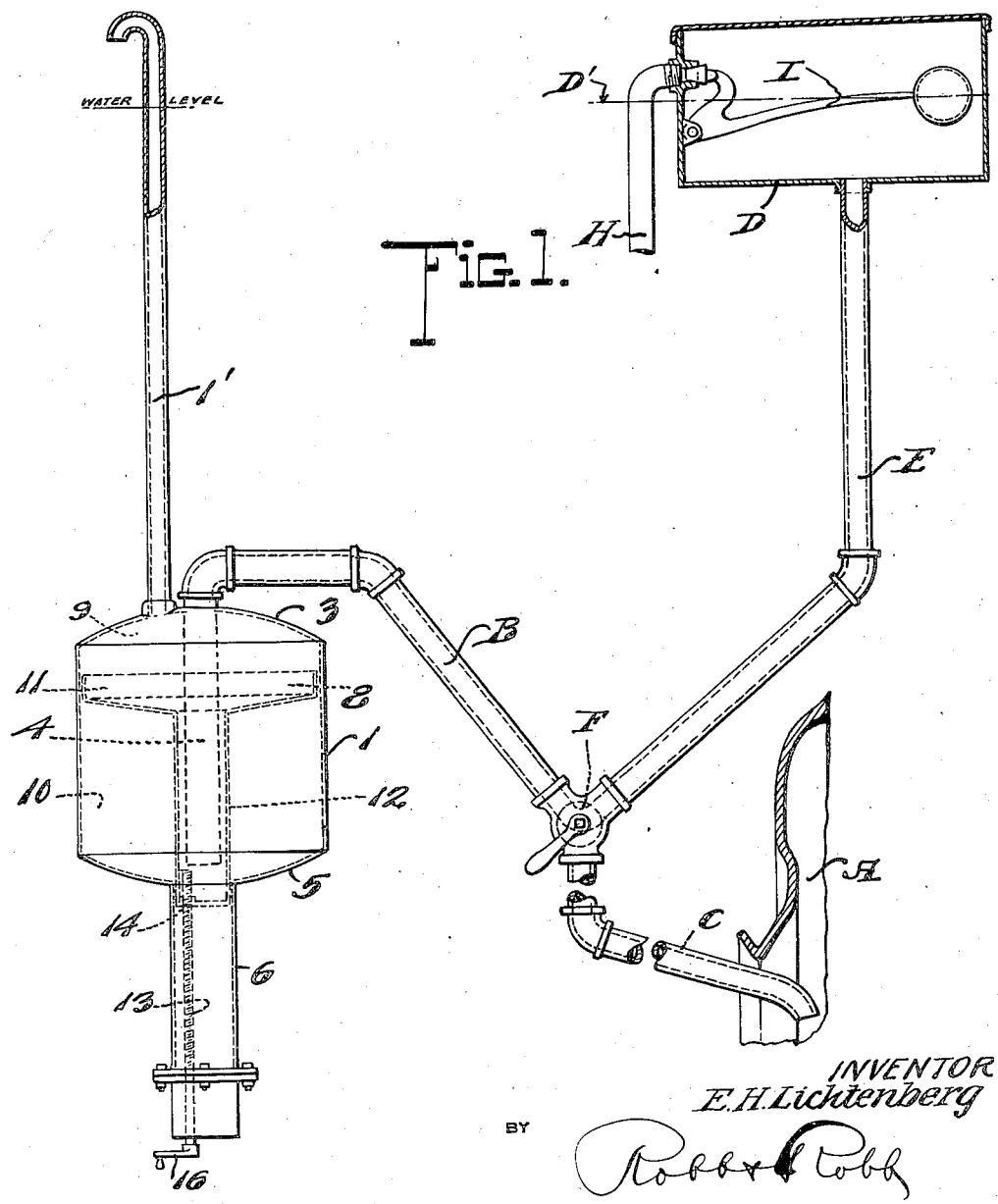
Fig. 1 is a diagrammatic elevation partly in section, showing my improved water measuring apparatus as applied to a concrete mixing device.

Like numerals refer to like parts in the several figures of the drawings, in which 1 represents my improved water measuring apparatus which is adapted to supply mixing water to the concrete mixing drum A through the pipes B and C under control of the three-way valve F. The pipe B is also used to fill or charge the measuring apparatus 1 from the storage receptacle D through the pipe E when the three-way valve F is shifted to the position shown in Fig. 1.

A sufficient quantity of liquid to replenish the amount discharged from the measuring apparatus 1 is maintained in the storage receptacle D. This liquid is supplied to the receptacle through the pipe H and the level in the receptacle is controlled by the float actuated valve member L.

The measuring receptacle 1 is provided with a relatively small standpipe 1' which extends upwardly to a point above the level of the liquid in the reservoir or receptacle D. Referring to Fig. 2 in which the standpipe 1' is replaced with the conventional liquid actuated check valve 2, the measuring tank 1 comprises a cylindrical casing 1a enclosed at one end with a curved end plate 3 into which is centrally disposed the siphon pipe 4 which extends downwardly to a point adjacent the bottom of the casing 1a. The lower end of the casing is closed by the end plate 5 which is provided with a depending, centrally located, cylindrical tube or well 6, the bottom of the well 6 being closed by the plate 7.

Arranged for vertical movement within the above described receptacle 1 is a supplemental open receptacle indicated generally at 8. This receptacle closely defines the walls of the main or outer receptacle 1, forming a sort of movable partition dividing the main receptacle 1 into upper and lower compartments 9 and 10. The supplemental receptacle 8 comprises a flanged cylindrical tray portion 11, having a cylindrical tubular extension 12 depending therefrom, the diameter of the flanged tray portion being slightly less than the internal diameter of the cylindrical casing 1a to provide a working fit between these two receptacles while at the same time permitting a passage of water between the upper and lower compartments when the supplemental receptacle 8 is shifted. The cylindrical tubular extension 12 of the tray is slightly smaller in diameter than the well 6 and is adapted to be guided thereby.

A threaded rotatable stem or actuating member 13 extends upwardly through the closure plate 7 of the well 6 and is received in a threaded opening 14 in the bottom plate of the tubular extension 12 of the tray. A packing gland 15 is provided in the plate 7 to prevent leakage of water from the main receptacle around the stem 13. The end of the stem 13 is provided with an operating handle 16 and carries thereon just above the handle a pinion 17 meshing with the pinion 18 carried by the indicating device 19 which in turn is mounted on the plate 7. This indicating device may be of any conventional design and calibrated to indicate the quantity of water contained in the tray 11 and tubular extension 12 above the end of the siphon pipe 4 plus the quantity of water in the upper compartment 9 above the flanged walls 11a of the tray member 11. The receptacle 1 is also provided with a drain plug 20 at the lower end of the well 6 to withdraw the water therefrom when it is desired to flush out or clean the device.

If it is desired, a water gauge 21 may be mounted on the receptacle 1 to determine the water level within the upper compartment 9 of the measuring receptacle.

In the operation of the measuring apparatus, when the three-way valve F is turned to the position shown in Fig. 1, the tank will be filled from the storage receptacle D. The level of the liquid in the tank 1 will rise in the standpipe 1' to the level of the water in the storage tank D, but since this level is substantially constant, this additional amount of water can be calculated and included in the amount delivered to the mixer A. When the three-way valve F is turned to discharging position, communication is then established between the pipes B and C while the pipe E is closed. This permits the water within the upper compartment 9 of the receptacle 1 to be siphoned off by the tube 4. Since the discharge end of the siphon pipe 4 extends down into the tubular extension 12 of the flanged tray, the water will be withdrawn from the tray 11 and the extension 12 until the water level reaches the end of the siphon pipe 4, whereupon the air will be admitted to the siphon pipe 4. The siphoning action will then be broken and the water discharge discontinued.

When the paving machine carrying the water measuring apparatus is working on an incline, the water level within the tank will not be horizontal and consequently will not coincide with the upper flanged edge 11a of the tray portion 11 as the water is withdrawn. Under these conditions, the quantity of water removed from the receptacle 1 minus that contained by the tray portion and tubular extension will be indicated by the water line WL, whereas the amount of water withdrawn from the receptacle 1, exclusive of that contained in the tray and tubular extension, is indicated at WX when the measuring device is in a vertical position. Due to the comparatively close spacing of the flanged rim 11a of the tray 11 with respect to the wall of the casing 1a, the variation in the amount of water discharged will be that amount located between the water levels WL and WX as enclosed by the inner wall of the casing 1a and the flange 11a of the tray, which due to the very minute clearance therebetween is negligible.

When the operator desires to vary the amount of water delivered, he rotates the threaded stem 13 which raises or lowers the flanged tray 11. In the event of lowering of the tray, the water contained in the compartment 10 is forced upwardly between the flanges 11a of the tray and the inner wall of the casing 1a, while if it is desired to decrease the quantity of water delivered, the tray will be moved upwardly which will force the excessive water above the tray downwardly between the tray's flanges and the inner wall of the casing. The operator may note the reading of the indicator device 19 as the handle 16 is turned and thereby set the tray member so that any desired amount of water may be delivered to the mixing drum.

It should be observed that as the tank is filling the incoming water is directed downwardly against the bottom of the tubular extension 12 which stirs up any sediment existing, whereupon when the tank is discharged, this sediment will be withdrawn from the extension 12, thus making my water measuring tank self cleaning. When it is desired to completely remove the water from the well, the operator will rotate the handle 16 to raise the well so that the bottom thereof will be adjacent the end of the siphon pipe 4, and under these conditions a very complete cleaning of the well can be accomplished, after which the operator may reset the tank for the desired quantity of water to be delivered.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a water measuring device, a closed vertical main tank, a supplemental tank vertically movable within the main tank and having its top closed by the top of said main tank, and a siphon pipe extending into said supplemental tank, the supplemental tank closely defining the walls of the main tank and so related thereto as to deliver a predetermined amount of water independently of any tilting of the device.

2. In a water measuring device for supplying mixing water to concrete mixing machines, a closed vertical main tank, a supplemental tank vertically movable within the main tank and having its top closed by the top of said main tank, and a siphon pipe extending into the supplemental tank centrally thereof, whereby a predetermined amount of water will be delivered from the device independently of any tilting thereof.

3. In a water measuring device, a vertically disposed cylindrical tank, a supplemental cylindrical tank vertically shiftable within the main tank and having its top closed by the top of said first mentioned tank, and a siphon pipe extending vertically into said supplemental tank, the device being adapted to deliver a predetermined amount of water independently of any tilting thereof.

4. In a water measuring device, a closed vertical main cylindrical tank disposed with its axis substantially vertical, a supplemental cylindrical tank disposed within the main tank and closely defining the walls thereof and vertically movable therein, said supplemental tank having its top closed by the top of the main tank and means to introduce water into and discharge water from said supplemental tank, the device being adapted to deliver a predetermined amount of water independently of any tilting thereof.

5. In a water measuring device, a closed main tank, a supplemental tank movably disposed within the main tank with the outer portion thereof closely defining the inner wall of the main tank, means to introduce water into said supplemental tank and main tank, and means to remove water from said supplemental tank and main tank under the influence of gravity.

6. In a water measuring device, a cylindrical closed tank disposed with its axis vertical, an open cylindrical supplemental tank disposed concentrically within the main tank for vertical movement and having its outer edges thereof closely defining the inner walls of the closed tank throughout its complete range of movement to form a partition between the ends of the closed tank, means for shifting said supplemental tank to vary the capacity of the portion of the tank above the partition, and means arranged in the supplemental tank for supplying a liquid to both of said tanks and withdrawing the liquid from said supplemental tank and the upper portion of said main tank under the influence of gravity.

7. In a water measuring device, a closed cylindrical tank, a supplemental tank disposed within the closed tank and movable along the axis thereof, said second tank comprising an inwardly tapered tray portion and a cylindrical extension, and a siphon discharge and filling pipe projecting into said supplemental tank and extending into said cylindrical extension.

8. In a water measuring and dispensing apparatus, a main cylindrical tank having closed ends, a supplemental tank disposed within the main tank in close proximity to the interior cylindrical walls thereof, a reduced tubular extension projecting below the supplemental tank in concentric relation to the main tank, a siphon discharge and tank filling tube extending through said supplemental tank into said cylindrical extension of the supplemental tank, and means for moving the supplemental tank.

9. In a water measuring device, a closed cylindrical tank adapted to be disposed with its axis in a vertical position, an open cylindrical supplemental tank disposed within the closed tank and having its free edges disposed adjacent the walls of the closed tank, said second tank dividing the closed tank into upper and lower compartments, a siphon discharge and filling pipe extending into said open tank through the upper compartment, means for permitting the escape of trapped air from within the closed tank during the filling operation, and means for vertically moving said open tank to vary the capacity of one of said compartments.

10. In a water measuring and dispensing device, a closed water measuring tank, a water supply tank therefor disposed at a higher level than the measuring tank, means for supplying water to said measuring tank from said supply tank, and means for discharging predetermined amounts of water from said measuring tank and including a supplemental tank disposed within the measuring tank and movable vertically therein.

11. In a water measuring and dispensing apparatus, a water measuring tank disposed to discharge measured quantities of water into the mixing drum of a concrete mixing machine under influence of gravity, a second water tank disposed above the first tank, means for supplying water to said second tank under pressure, a conduit for discharging measured quantities of water from the first tank into the drum, a second conduit for supplying water from the second tank to the first tank, valve means for alternately establishing communication between the first tank and the second tank and between the first tank and the discharge conduit, and a vent pipe for said measuring tank having its outlet disposed above the level of the liquid in the second tank.

12. A water measuring device for concrete mixers comprising a pair of concentric cylindrical receptacles, one of said receptacles being disposed within the other and longitudinally movable thereinto, a reduced concentric extension depending from each of said receptacles, and a siphon discharge and filling pipe extending through said receptacles concentrically thereof and having its extremity extending into the reduced concentric extension of one of the receptacles.

In testimony whereof I affix my signature.

ERICH H. LICHTENBERG.